(No Model.)
T. HUDSON, E. ROWE & C. HESLOP.
COAL MINING MACHINE.
No. 345,696. Patented July 20, 1886.
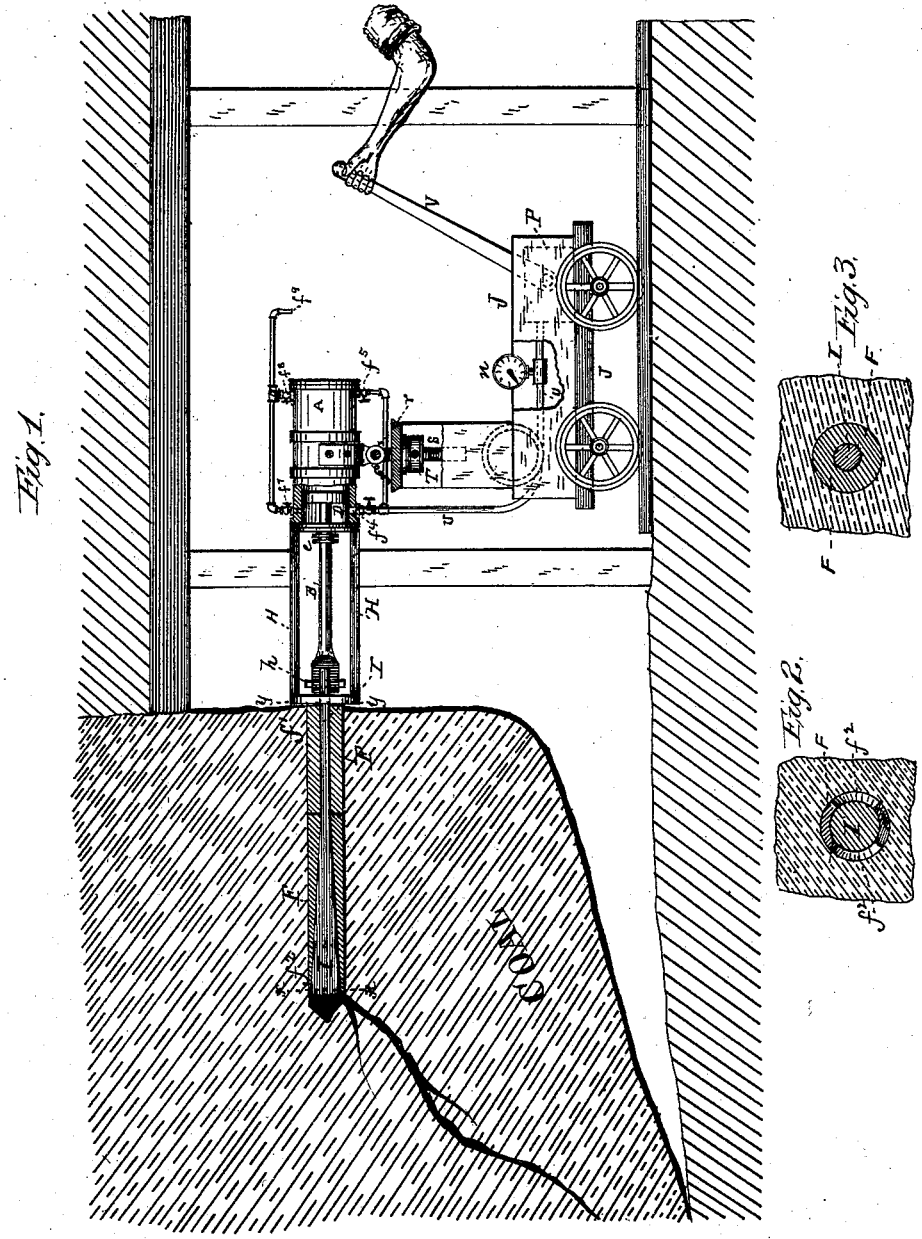
Witnesses:
Barrett
David A. McKee
Inventors:
Thomas Hudson
Edward Rowe
Christopher Heslop
Per:
James H. Lancaster
Att'y.

UNITED STATES PATENT OFFICE.

THOMAS HUDSON AND EDWARD ROWE, OF DARLINGTON, COUNTY OF DURHAM, AND CHRISTOPHER HESLOP, OF STRANGHOW, COUNTY OF YORK, ENGLAND, ASSIGNORS TO JAMES H. LANCASTER, OF NEW YORK, N. Y.

COAL-MINING MACHINE.

SPECIFICATION forming part of Letters Patent No. 345,696, dated July 20, 1886.

Application filed November 14, 1885. Serial No. 182,830. (No model.) Patented in England January 21, 1884, No. 1,825.

*To all whom it may concern:*

Be it known that we, THOMAS HUDSON and EDWARD ROWE, both of Darlington, in the county of Durham, England, and CHRISTOPHER HESLOP, of Stranghow, in the county of York, England, have invented certain new and useful Improvements in Hydraulic Coal Wedging and Breaking Machines; and we do hereby declare that the following is a full, clear, and exact description thereof.

We have found that in breaking down coal and other comparatively soft and yielding material the use of wedge, or wedges driven into the bed of coal or mineral is not sufficient to effect the required purpose.

Now, our invention consists in breaking down coal, salt, slate, stone, &c., by means of a wedge, which is drawn outward by means of hydraulic pressure. The object gained by withdrawing the wedge, instead of driving it inward, is that the coal, &c., is broken from the interior of the hole outward, which causes a larger piece of coal, &c., to be broken off.

Figure 1 is a side view of our machine mounted on a truck and ready for use. Fig. 2 is an enlarged sectional view on line $x\ x$, Fig. 1. Fig. 3 is an enlarged sectional view on line $y\ y$, Fig. 1.

A represents a cylinder closed at one or both ends.

B is a piston-rod, provided with a piston-head, D, and passing through a packing-box, $e$, in the closed end of said cylinder. To the outside of this piston-rod B is attached the wedge-shaped bar L, and which is connected and held thereto by the pin $h$.

F F are tapered jaws or shells (in halves) placed over and around the wedge-shaped bar I. The outer ends, $f^2$, are preferably made concave or slotted, to accommodate the desired shape of the wedge portion of the bar I. By making the jaws or shells in halves and tapered they are allowed to expand and open as the wedge-bar is drawn back or outward.

Between the jaws or shells F F and the distance or pressure piece or pieces H may be inserted over the bar I a collar, $f'$. The shell and collar may, however, be in one piece or separated, and both may be tapered and jaw-shaped.

The object of the distance or pressure piece H is to steady the movement of the piston and wedge rod, and also to serve as an abutment or bearing between the machine and the coal or other minerals, thus forming a resistance for exerting the required pressure for breaking down the minerals. These distance-pieces may, if desired, be cast solid to the cylinder A.

The machine, as described, is mounted on the truck J, and held thereto and raised and lowered thereon by the screw S, which is acted upon by the nut T. The machine is pivoted on pin $r$ to the screw S, to allow it to be adjusted. This truck carries the pump P, for forcing the water into the cylinder A for operating the piston. V is the pump-handle. U is a tube for conveying the fluid into the cylinder A, which passes through opening $f^4$ in said cylinder. N is a pressure-gage. $f^6$ is another pipe connecting the tube U and cylinder A. The object of this tube is to convey the fluid into the rear end of the cylinder, to force the piston forward and toward the mineral. $f^5$ is a stop-cock attached to pipe $f^6$. The expelled fluid in the cylinder is carried off through pipes $f^7\ f^8\ f^9$ to the pump-tank. These pipes are provided with stop-cocks to direct the flow of fluid. By this arrangement the piston is under the control of the operator and affected by means of one and the same pump.

The operation of our machine or apparatus is as follows: A hole of the required depth and diameter being drilled into the coal or other mineral to receive the jaws or shells F F, such being usually made about three feet six inches deep and three-eighths of an inch in diameter. Then insert the wedge-bar I, and afterward pass the jaws or half-shells F F over same, which thus incases the said wedge-bar I. The collar or sleeve is then slid or passed over the end of the bar I nearest the machine, and the said bar coupled to the piston-rod B. The distance-pieces are then put in position, as shown in Fig. 1. Liquid (soft soap and water or any other elastic fluid) is then pumped or forced into the cylinder A, through pipe U and the opening $F^4$, against the piston-head D. This forces the said piston-head back or outward, carrying with it the piston-rod and wedge-bar I. This movement of the wedge-bar causes the wedge part to exert a pressure on the outside shell, F, equal to the angle of the said wedge. This pressure is instantly transmitted to the coal or stone, which bursts, breaks, or splits asunder. To force the piston back into its original position for again operating the wedge, the fluid is directed through pipe $f^6$ into the rear end of the cylinder.

Rollers may be used to reduce the friction of the wedge-bar. Toggle-joints or lazy-tongs can be used in place of the distance-pieces H, if so desired.

By constructing a coal or stone breaking-down, getting, or splitting machine as above described many advantages are attained. Explosives which endanger the lives of the miners are dispensed with and the coal obtained by the use of this machine is in better condition and free from dust, and the consequent risks of spontaneous combustion and explosions.

We claim—

In a coal-splitting machine, the split shell F, having rearwardly-inclined inner faces, the wedge-bar I, having reversely-inclined faces reciprocating between the same and connected by piston B, all in combination with said rod and its hydraulic operating mechanism, whereby the coal is split by the outwardly-drawn wedge-bar, substantially as described and set forth.

In testimony that we claim the foregoing we have hereunto set our hands this 12th day of June, 1885.

THOMAS HUDSON.
EDWARD ROWE.
CHRISTOPHER HESLOP.

Witnesses:
THOMAS PALLISED CATTERICK,
JAMES LONGMORE LEADBETTER.